April 21, 1959          P. K. TIEN          2,883,481
MICROWAVE AMPLIFIER
Filed Dec. 31, 1956
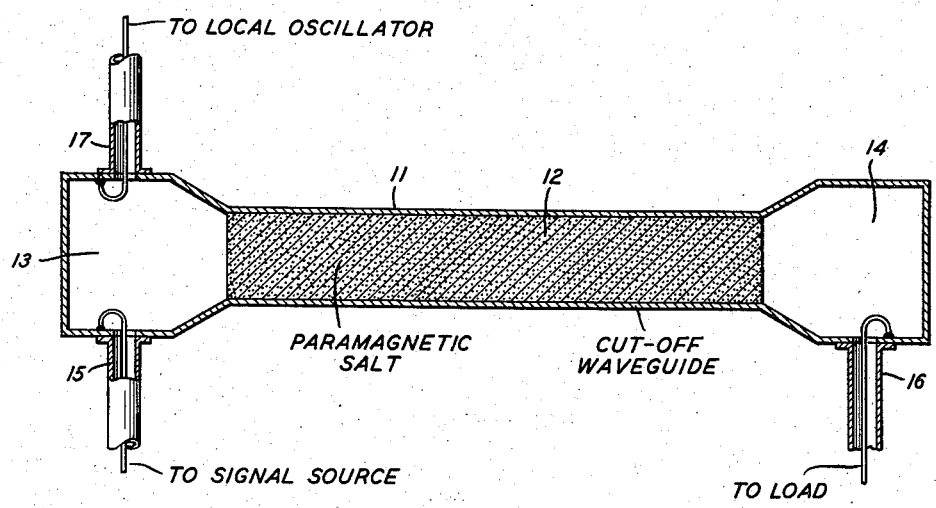
INVENTOR
P. K. TIEN
BY
ATTORNEY United States Patent Office 2,883,481
Patented Apr. 21, 1959

2,883,481
MICROWAVE AMPLIFIER

Ping K. Tien, Chatham Township, Morris County, N.J., assignor to Bell Telephone Laboratories, Incorporated, New York, N.Y., a corporation of New York Application December 31, 1956, Serial No. 631,951

8 Claims. (Cl. 179—171)

This invention relates to amplification by stimulated emission of radiation. Apparatus for such amplification is now generally described as a maser.

It is characteristic of a maser that it employs a medium in which there is established at least intermittently a non-equilibrium population distribution in a pair of spaced energy levels of its energy level system. In particular, the population of the higher of the selected pair of energy levels of its energy level system is made larger than that of the lower. It is now usual to describe a medium which is in such a state of nonequilibrium as exhibiting a negative temperature. It is characteristic that if there be applied to a medium which is in a negative temperature state a signal of a frequency which satisfies Planck's law with respect to the two energy levels which are in non-equilibrium $$\left(\nu = \frac{E_2 - E_1}{h} \text{ where } h \text{ is Planck's constant}\right)$$

then the applied signal will stimulate the emission of radiation at the signal frequency from the medium and the signal will be amplified.

Among the more promising forms of masers known is one which employs as the active material of the negative temperature medium an ionically bound crystalline paramagnetic salt whose energy level system is characterized by at least three spin energy levels with the separations of these three energy levels falling within suitable operating frequency ranges. To this crystal, there is supplied continuously pumping power which effects transitions from the lowest to the highest of the selected three energy levels. By power saturation of the highest energy level whereby the populations of the highest and lowest energy levels are substantially equalized, there is established in one of these two energy levels a nonequilibrium population distribution with respect to the intermediate energy level of the selected three whereby a negative temperature results in the crystal. Thereafter, a signal of appropriate frequency can be amplified by being applied to the crystal. The principles of a maser of this kind are described in more detail in an article in The Physical Review, volume 104, No. 2, pages 324–327, entitled "Proposal for a New Type Solid State Maser," by N. Bloembergen.

Since the present invention has primary application to a maser of this kind, it will be convenient to discuss it with specific reference to such a maser, although as will appear it has application to other forms as well.

In a three level maser, of the kind described, it has generally been the practice to confine the signal power for interaction with the negative temperature medium in a resonant cavity because of the high Q and resulting high efficiency such a circuit provides. However, there are various disadvantages associated with the use of a resonant cavity to confine the signal power. In particular, a resonant cavity tends to be useful only for operation over a narrow band centered around the resonant frequency of the cavity. Additionally, it is relatively inconvenient to couple in and out of a cavity. Moreover, it appears that the use of a resonant cavity results in some degradation of the low noise qualities of the maser.

To overcome some of these disadvantages, it has been proposed previously to house the negative temperature medium in a conventional straight through wave guide. However, this arrangement suffers from a low efficiency of interaction.

To improve this situation, it is being suggested in a copending application filed simultaneously herewith, Serial No. 631,643, of H. Seidel, that the signal power be made to propagate along a slow wave circuit for interaction with the negative temperature medium. This tends to make possible a growing wave type interaction with a consequent improvement in efficiency. Various structures are disclosed therein for use in this way.

The present invention similarly involves the use of a structure for providing a low group velocity to the signal as it propagates through the negative temperature medium to extend the transit time during which the signal power interacts with the negative temperature medium. In particular, it is characteristic of a maser in accordance with the invention to house the negative temperature medium in a hollow wave guide which is dimensioned to have an effective characteristic cutoff frequency, i.e. a frequency below which an electromagnetic wave will not ordinarily propagate, which is appreciably higher than the frequency of the signal power to be amplified. For example, in a rectangular wave guide operated at $TE_{01}$ mode the cutoff frequency is $$\frac{1}{2a\sqrt{\mu\epsilon}}$$

where $\mu$ and $\epsilon$ are respectively the permeability and the dielectric constant of the medium inside the wave guide and $a$ is the width of the guide. The cutoff characteristics of various types of wave guides have been discussed in detail in a book by Ramo, S. and Whinnery, J. R., entitled "Fields and Waves in Modern Radio" (John Wiley and Sons, Inc. 1947), chapters 8 and 9. It will be characteristic of such a wave guide, when filled with a typical negative temperature medium, that the group velocity of the signal power will be extremely small, and that the wave guide will store considerable signal energy while permitting only a small flow of real power. Essentially, in this situation the wave guide acts as a distributed reactive circuit with an unloaded Q which is very high. Such a reactive circuit produces large magnetic fields with low driving power, and this characteristic is especially useful in a three level maser of the kind described because the radiation emitted is proportional to the magnitude of the stimulating magnetic field.

To achieve fully the benefits made possible by the use of a circuit of the kind described, it is important to provide input and output connections to the respective ends of the wave guide which are well matched to the highly reactive impedance of the growing signal wave in the wave guide. To this end, in an embodiment of the invention, the wave guide is advantageously connected at each end to a separate transformer comprising a section of wave guide which has a characteristic cutoff frequency lower than that of the signal power and which is short circuited to provide thereto a highly reactive impedance for providing a good match between the wave guide and the input and output external connections thereto.

The principles of the invention will be better understood from the following more detailed description taken in conjunction with the accompanying drawing which shows an illustrative embodiment of the invention.

With reference now more particularly to the drawing, in the illustrative maser 10 shown a hollow wave guide 11, typically of copper to have low losses and rectangular in cross section, serves to house the negative temperature medium 12 which in a three level maser of the kind of primary interest is an appropriate paramagnetic salt. The paramagnetic salt need not fill the wave guide completely although it is important that it be distributed uniformly along the entire length of the wave guide. Various paramagnetic salts are suitable for use in a three level maser. For purposes of exposition it will be convenient to assume that the paramagnetic salt is a nickel Tutton salt of the kind described in copending application Serial No. 623,648, by K. D. Bowers. Typically, a medium which is one percent

diluted in 99 percent the isomorphous zinc salt

is useful to amplify a signal of approximately 30 kilomegacycles per second when supplied with pumping power of a frequency of approximately 74 kilomegacycles per second. Such a salt has the desired three discrete energy levels important for the operation of a three level maser even in the absence of any applied static magnetic field. Accordingly, it will be unnecessary in the embodiment depicted to include apparatus for providing such a magnetic field. However, it is feasible to employ as the negative temperature medium salts of the kind described either in the aforementioned Physical Review article or in copending application Serial No. 625,548, filed November 30, 1956, by H. E. D. Scovil in which case provision should be made for providing the required static magnetic field to the salt. Typically, such a medium may comprise a crystalline paramagnetic salt which is approximately one-half of one percent gadolinium ethyl sulphate, approximately 1/20 of one percent cerium ethyl sulphate and the remainder lanthanum ethyl sulphate. For such a medium, the steady magnetic field may be applied at an angle of about 73 degrees from the crystalline axis and with an intensity of about 3,000 oersteds. A negative temperature may be established in such a crystal by supplying pumping power of a frequency of approximately 17.5 kilomegacycles. As a consequence, amplification at a frequency of approximately 9.0 kilomegacycles is made feasible.

Moreover, in accordance with a feature of the invention, the filled wave guide 11 is dimensioned to have an effective characteristic cutoff frequency for operation, for example, in the $TE_{01}$ mode which is higher than the frequency of the signal to be amplified. The more by which the cutoff frequency exceeds the signal frequency, the higher will be the amplification per unit length. Advantageously, the cutoff frequency should be at least five percent higher than the signal frequency. However, excessively high amplification is undesirable where amplification of an applied signal is intended since it makes it difficult to avoid regenerative oscillation. Principles for designing such a wave guide are well known to workers in the art. Propagation of power of a frequency below the characteristic cutoff frequency is not possible in an ideal empty lossless wave guide. Analysis of the propagation characteristics of a filled wave guide of this kind indicates that the imaginary component of the transmitted power, or the reactive power, is much larger than the transmitted power. This corresponds to a time-phase angle difference of nearly 90 degrees between the transverse electric and magnetic fields. The wave guide acts essentially as a distributed reactive circuit with an unloaded Q which is extremely high and small input power can produce a large reactive field. Since the amount of radiation stimulated by maser action is proportional to the magnitude of the magnetic field, high amplification efficiency is possible.

There are several problems which must be considered to derive maximum advantage from a circuit of this kind. First, since the phase propagation constant $\beta$ of the signal will be very small, it will be inconvenient to utilize a wave guide which is many wavelengths long. Any reflected wave is therefore difficult to eliminate unless the wave guide is made to have nonreciprocal properties. To avoid the need for this complication, it is important to provide a well-matched coupling connection at the two ends of the wave guide 11. Moreover, because of the small characteristic phase propagation constant $\beta$, the field configurations tend to be quasi-static, and it is important to localize the input and output coupling connections to the two ends of the wave guide.

To meet these difficulties, in a preferred embodiment of the invention, there is employed at each end of the wave guide a transformer which matches the highly reactive impedance of the wave guide to the external transmission line which connects the maser into a useful system, i.e., the line supplying the input signal to the maser from a signal source at the input end and the line abstracting the output signal from the maser for propagation to a load at the output end.

In particular, each transformer 13, 14 comprises a short-circuited wave guide section or stub which is free of the paramagnetic salt and whose dimensions are chosen such that its characteristic cutoff frequency is lower than that of the signal frequency and so considerably lower than that of the wave guide 11. A separate external coupling connection 15, 16 is provided to each transformer 13, 14. Such coupling may take the form of an inductive loop in the manner known to workers in the art for coupling to the $TE_{01}$ mode chosen for operation by way of example. The dimensions of each of the transformer sections and the degree of coupling between each transformer and its external connection thereto are adjusted for an optimum impedance match. Moreover, advantageously, there is provided a transition region 17, 18 as part of each transformer section along which its dimensions are tapered to improve the match. Alternatively, it is feasible to employ as the transformer a wave guide section of the same cross section as the wave guide 11, which is loaded with either dielectric or magnetic material to provide the desired difference in characteristic cutoff frequency.

In a three level maser, it is important additionally to supply pumping power of appropriate frequency to the paramagnetic salt to establish a negative temperature therein. Such pumping power frequency will ordinarily be of a frequency higher than that of the signal frequency. To minimize the amount of pumping power necessary, it is advantageous to make the entire structure including the wave guide 11 and the two transformers 13, 14 resonant at the pumping power frequency. This can be achieved readily by properly dimensioning the wave guide 11. It is particularly advantageous to have the wave guide 11 of such cross section that its effective characteristic cutoff frequency is equal to or slightly below the pumping power frequency, whereby there is increased the uniformity in level of the pumping power along the wave guide 11. The pumping power can be supplied most readily by an inductive loop which supplies to either of the two transformers by way of an external transmission line power supplied from a suitable local oscillator. The orientation of the field patterns of the signal power and the pumping power are adjusted in accordance with the characteristics of the paramagnetic salt.

It is to be understood that the specific embodiment described is merely illustrative of the general principles of the invention. Various other arrangements may be devised by a worker in the art without departing from the spirit and scope of the invention. In particular, the wave guide may be of other form, such as circular in cross section and may be energized in various other modes. Additionally, the paramagnetic salt may be of various types. Moreover, in masers which do not require the use of pumping power, for use as transformers there can be utilized open-circuited stubs of wave guides of appropriate length for impedance matching. Still again, if there be provided reflective terminations at the two ends of the wave guide to encourage oscillations, there will result an oscillator from which useful power can be abstracted by an external connection at one end of the wave guide.

What is claimed is:

1. A microwave amplifier comprising a wave guide, means forming a negative temperature medium within said wave guide comprising a paramagnetic salt whose energy level system comprises three discrete levels of which the separation of an adjacent pair corresponds to the signal frequency and the separation of the nonadjacent pair corresponds to a different frequency, the effective cutoff frequency of the wave guide including said medium being higher than the signal frequency to be amplified, input and output external connections for applying and abstracting, respectively, signal power from said wave guide, a separate transformer at each end of the wave guide intermediate between the wave guide and a different one of said external connections for matching the external connection to the wave guide, and means for supplying power at said different frequency to the wave guide for establishing a negative temperature in the medium.

2. A microwave amplifier in accordance with claim 1 characterized in that each of said transformers comprises a wave guide stub having a characteristic cutoff frequency which is below the signal frequencies to be amplified.

3. A microwave amplifier in accordance with claim 1 further characterized in that each of said transformers comprises a short-circuited wave guide stub having a characteristic cutoff frequency which is below the signal frequencies to be amplified.

4. A microwave amplifier comprising a wave guide, means comprising a negative temperature medium distributed substantially uniformly along the length of said wave guide within the field of said wave guide, the negative temperature medium comprising a paramagnetic salt whose energy level system comprises three discrete levels of which the separation of an adjacent pair corresponds to the signal frequency and the separation of the nonadjacent pair corresponds to a different frequency and the effective cutoff frequency of the wave guide including said medium being higher than the signal frequency to be amplified whereby the wave guide is characterized by a highly reactive impedance to the signal frequency, at least one external connection, and a transformer interconnecting one end of the wave guide and the external connection for providing an impedance match between the wave guide and the external connection, and means for applying pumping power at said different frequency to the wave guide for establishing a negative temperature in the medium.

5. A microwave amplifier in accordance with claim 4 further characterized in that the transformer comprises a short-circuited stub of a wave guide having a characteristic cutoff frequency below the signal frequency to be amplified.

6. A microwave amplifier in accordance with claim 5 further characterized in that the wave guide including the medium has a cross section smaller than the cross section of the short-circuited stub and that the short-circuited stub includes a transition region where its cross section is tapered.

7. A microwave amplifier comprising a wave guide, a paramagnetic salt distributed substantially uniformly within said wave guide which is to serve as a negative temperature medium to be stimulated for the emission of radiation of signal frequency, the paramagnetic salt being characterized by an energy level system of which the separation of an adjacent pair corresponds to the signal frequency and the separation of the nonadjacent pair corresponds to a different frequency, the wave guide including the salt having a cutoff frequency higher than the signal frequency, external input and output signal connections, a separate transformer at each end of the wave guide for interconnecting the respective end to different ones of the external input and output signal connections, each transformer comprising a short-circuited stub of a wave guide having a cutoff frequency below the signal frequency, and a coupling connection for applying to the paramagnetic salt pumping power of the different frequency to establish a negative temperature in the paramagntic salt, the two short-circuited stubs and the wave guide including the paramagnetic salt forming a structure resonant at the different frequency.

8. An amplifier according to claim 7 in which the wave guide including the paramagnetic salt has a cutoff frequency substantially equal to the different frequency whereby the level of the pumping power is relatively uniform along the length of said wave guide.

References Cited in the file of this patent

UNITED STATES PATENTS 2,743,322     Pierce et al. _____ Apr. 24, 1956

OTHER REFERENCES

Publication—Physical Review, volume 91, Number 5, September 1, 1953, page 1074, Fig. 3, "Electronic Structure of F Centers Saturation of the Electron Spin Resonance," by D. M. Portis.